United States Patent [19]

Schnell

[11] Patent Number: 4,823,439
[45] Date of Patent: Apr. 25, 1989

[54] MACHINE FOR FILLING DOUGH-LIKE MATERIALS

[76] Inventor: Karl Schnell, Mühlstrasse 28, 7065 Winterbach, Fed. Rep. of Germany

[21] Appl. No.: 54,268

[22] Filed: May 22, 1987

[30] Foreign Application Priority Data

May 24, 1986 [DE] Fed. Rep. of Germany ....... 3617560

[51] Int. Cl.$^4$ ............................................. A22C 11/10
[52] U.S. Cl. ........................................... 17/33; 17/37
[58] Field of Search ................................ 17/33, 37, 49

[56] References Cited

U.S. PATENT DOCUMENTS 3,883,925  5/1975  Muller ..................................... 17/33
4,451,954  6/1984  Muller ................................. 17/33 X
4,602,402  7/1986  Schnell .................................... 17/33
4,709,450 12/1987  Stanley et al. .......................... 17/33
4,723,581  2/1988  Staudenrausch et al. .......... 17/38 X Primary Examiner—Willie G. Abercrombie
Attorney, Agent, or Firm—Horst M. Kasper

[57] ABSTRACT

A machine for filling pasteous media, particularly sausage stuffing, into a hose-shaped sleeve, comprises a filling pump having a pressure side, a filling pipe for receiving a sausage sleeve and connected with the pressure side of the filling pump and having a free end, a braking ring arranged so that a medium is pulled through the sleeve between the braking ring and the free end of the filling pipe, an electrically controlled motor which intermittently drives at least the pump, and a microcomputer which controls the motor.

32 Claims, 7 Drawing Sheets

MACHINE FOR FILLING DOUGH-LIKE MATERIALS

BACKGROUND OF THE INVENTION

The present invention relates to a machine for filling pasteous or dough-like materials or media, particularly sausage stuffing, into a hose-shaped sleeve.

More particularly, it relates to a machine of the above mentioned type which has a filling pump with a pressure pipe in a flow connection with a filling pipe which receives the serrated sausage sleeve, and the flowing medium is pulled through the sleeve between a braking ring and a free end of the filling pipe. Such machines are used especially in the food processing industry, and they are utilized in this field for producing sausages as well as for partial filling of spreadable cheeses and the like. These machines must satisfy two main requirements, namely a high efficiency of apportioning on the one hand, and a high accuracy of the portion weight on the other hand. When the filled serrated sausage sleeve which can be composed of a natural intestine and also of a synthetic plastic sleeve, is filled and not subdivided, a sausage is produced with a length corresponding to the stretched length of the serrated sausage sleeve. Such a sausage cannot be used commercially and therefore, the moving filled sausage strand is subdivided directly in the filling machine into individual portions. This is performed by squeezing of the filled sausage sleeve at regular distances by means of a squeezing device and a so-called clip setting device, or by turning by means of a turning device. Clips are formed as a rule as metal clamps, and they can be arranged either individually or in pairs with a small distance. In the latter case each sausage is provided with a clip at both ends. It is to be understood that all sausages after clip setting or turning are still connected with one another.

During turning the moving filled sausage strand is clamped in a suitable manner, for example under its own weight, and the filling pipe is rotated with the sausage sleeve located on it, at least once about its longitudinal axis. As a result of this it is restricted at the predetermined location shortly behind the free end of the filling pipe, so that two adjoining sausage tips are produced. Then the sausage is automatically pulled from the filling pipe so that the medium to be pumped flows into the sausage sleeve. It is to be understood that the starting portion of the sausage sleeve must be closed.

In known filling machines of this type, the drive is performed by a hydraulic transmission via a coupling-brake combination or a stepping motor. As a result of this, they achieve a very good apportioning speed which, however, is not very high. Also, a higher portion accuracy is desirable.

SUMMARY OF THE INVENTION

Accordingly, it is an object of the present invention to provide a machine for filling pasty media, particularly sausage stuffing, of the above mentioned general type which can increase the number of portions per time unit and provide high portion accuracy.

In keeping with these objects and with others which will become apparent hereinafter, one feature of the present invention resides, briefly stated, in a machine for filling pasty media, particularly sausage stuffing, into a hose-shaped sleeve, which has a filling pump with a pressure side connected with a filling pipe which receives a serrated sausage sleeve, and the flowing medium is pulled through the sleeve between a braking ring and a free end of the filling pipe, wherein at least the pump is intermittently driveable by an electrically controllable motor, particularly a magnetic rotor, and at least the motor is controllable by a microcomputer.

When the machine is designed in accordance with the present invention, the utilization of an electrically controllable motor, particularly a so-called magnetic rotor, simplifies the drive, on one hand, and provides a higher portioning speed, on the other hand, because such motors can be started and stopped or decelerated and accelerated at the rate of 400 times per minute. The latter is required when the clip setting or turning is performed with the stopped or braked pump. Since such a motor is easily controlled by a microprocessor and the latter operates with extreme accuracy as well known in the art, the apportioning accuracy can be increased simultaneously.

In accordance with a further feature of the invention, the pump is formed as a gear pump which is provided with a driveable outer wheel having a plurality of inner teeth, and a pinion is eccentrically arranged relative to the outer wheel and provided with a plurality of outer teeth. Such pumps are used as feeding pumps, particularly in the sausage processing industry. They are very reliable and robust. In addition, a one or two-part pressure piece is provided, which separates the pressure side from the suction side. A further description can be dispensed with, since this pump is a known pump, at least with respect to its operating principle.

In accordance with a further feature of the present invention, the continuously produced sausage strand is subdivided into individual sausages at equal and preferably adjustable distances by means of a controllable clip device, when the pump drive is turned off. These clip devices are known. The clips are formed for example as U-shaped metal clamps which are fitted on the constriction point between neighboring sausage tips, and then deformed to form a ring or a wire coil. When two clips are arranged at a short distance from one another, the sausage sleeve can be separated between the clips so as to produce individual sausages.

Another variant in accordance with the present invention is that the filling pipe is rotated at least by one revolution, when the pump is turned off for sausage tip forming, by means of a turning device. Simultaneously with the filling pipe, the serrated sausage sleeve and the braking ring are also turned. Since on the other hand, the filled part of the sausage sleeve is not turned, a constriction point is formed shortly behind the free end of the filling pipe. During each turning, a finished sausage is thereby produced as well as a first tip of the subsequent sausage to be filled. The co-rotation of the filled sausage strand or the previously produced sausage requires no special devices. The weight and the friction are sufficient for rotary connection.

The controllable motor is connected in an advantageous manner with the drive shaft of the outer wheel of the pump by means of at least one transmission, particularly a toothed belt transmission. A toothed belt transmission provides for a high transmission ratio with a high precision and requires a small space.

In accordance with an especially advantageous embodiment of the invention, a pulse generator for at least the pump control is driveable by the drive shaft of the pump or a transmission shaft connected therewith. The use of the pulse generator is required for the precise electronic control and also provides a possibility for programming the machine. When the pulse generator is driven by the drive shaft of the pump or especially by a transmission shaft, a separate drive can be dispensed with and at the same time a synchronous operation is provided in a simple manner.

It is to be understood that the drive shaft of the pump or the transmission must rotate with a predetermined number of revolutions. It does not necessarily correspond to the required number of revolutions of the pulse generator and is not provided as such in the example. In accordance with a further embodiment of the invention, the impulse generator can be connected in driving connection with the drive shaft of the pump or the shaft of the transmission via a transmission, especially a further belt transmission or gear transmission. This transmission serves for the required precision. It remains to indicate that between the above mentioned toothed belt transmission and the driveable pinion of the pump, a further transmission can be provided and for example is provided, which is formed as a reduction gearing. The drive for the pulse generator can be provided from a shaft of this further transmission.

In accordance with a further embodiment of the invention, the drive shaft of the pump or the shaft of the transmission is a drive element of a drive of a feeding element in a filling container provided at the pump inlet. When a relatively highly fluid and fat rich mass is located in the filling container, it flows because of its own weight and its flowability from the filling container into the pump inlet located under it. When, however, relatively viscous masses must be apportioned, for example during production of salami, and a high discharge speed is required, this mass must be fed to the pump inlet. This is performed by a feeding element which is adjusted to the shape of the filling container and to the product to be fed. It is formed as a rotatable feeding element which can be driven in an advantageous manner synchronously with the abovementioned controllable motor. The required adjustment of the number of revolutions can optionally be provided by a further transmission.

In accordance with a further variant of the invention, the feeding element is driveable by a toothed wheel or toothed rim which engages with the pinion driven from the pump shaft or the transmission shaft connected therewith. When required, a coupling can be arranged between them. This is especially advantageous when the container must be spaced from the pump or at least from the filling opening of the pump for cleaning purposes.

In accordance with a further embodiment of the invention, the electrical control has a microcomputer which is composed of a microprocessor, memories and input/output components. From the pulses of the pulse generator which indicate a predetermined filling weight quantity per pulse and the desired weight quantity of the filled portion as well as from the physical data of the filling product and the filling material and from the predetermined working speed, the computer produces a first operating voltage ramp for the first motor which drives the filling pump and an opposite-phase operating ramp for the second motor which controls the turning or clip setting device.

In accordance with a further feature of the present invention, the electrical control is used so that for portioning of the respective first portion of a charge, a correcting value which reflects the start-up operation is produced. It corrects the pulse number supplied from the pulse generator for the first portion so that the desired weight quantity of the portion is maintained.

In accordance with a further embodiment of the electric control, the correction value for each charge is stored, and then called up from the memory for production of the respective first portion of a charge and supplied to the control.

Finally, in accordance with a further embodiment of the electric control, a random sample scale for automatic formation of the corrective value and for continuous automatic production monitoring of the filling quantities is connected, via an input/output control, to the continuous sausage production device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
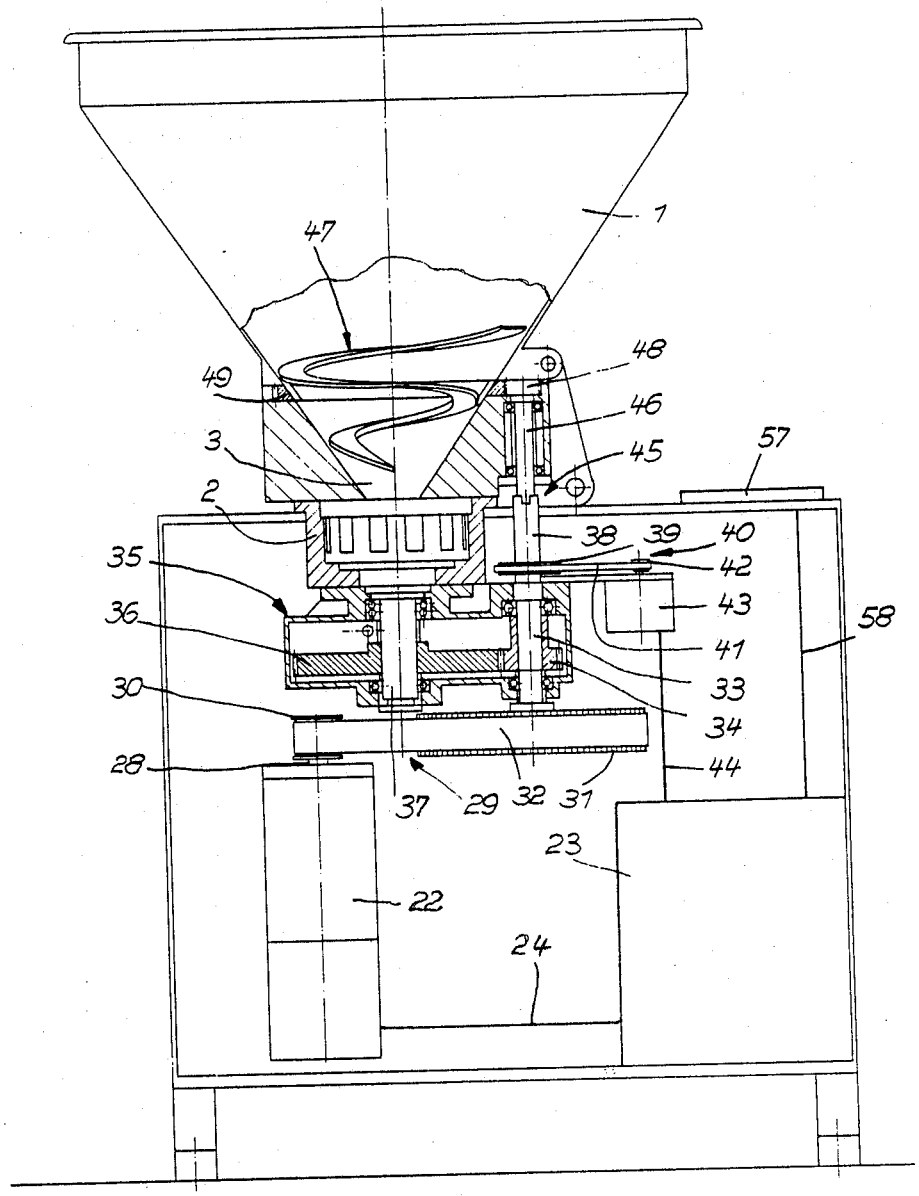
FIG. 1 is front view of a machine for filling pasty media, in accordance with the present invention, partially sectioned in a vertical direction.

A pasteous medium which is to be filled in portions, particularly sausage stuffing, is supplied to a filling container 1 for example by a not shown suitable charging device. The filling container has preferably a conical shape and is located above a filling pump 2. More particularly, an outlet 3 of the filling container 1 lies above an inlet 4 of the filling pump 2. The important elements of the filling pump include a driven outer wheel 5 which has a plurality of inner teeth and is provided with a drive shaft 7, and a pinion 6 which is arranged eccentrically to the outer wheel 5 and has a plurality of outer teeth and a bearing pin 7'. The teeth 8 of the pinion engage into the tooth gaps 9 of the outer wheel 5, while the teeth 10 of the outer wheel 5 engage into the tooth gaps 11 of the pinion 6.

Figure 3:
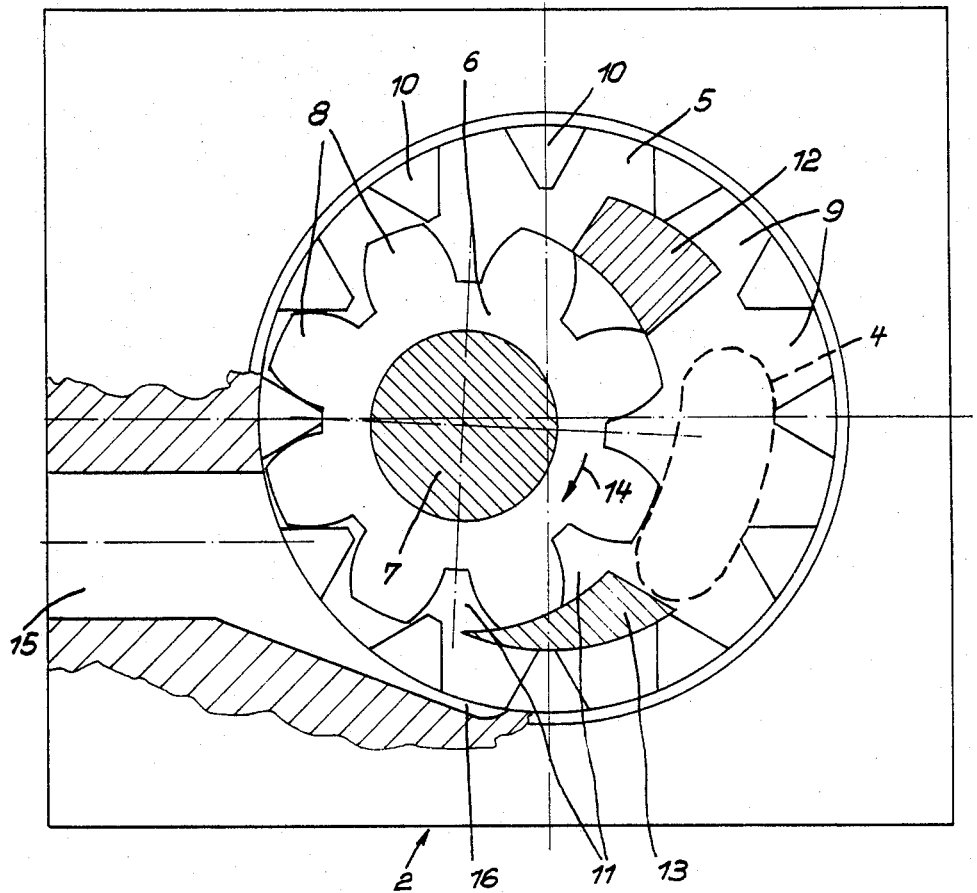
FIG. 3 is a schematic showing of a feeding pump on an enlarged scale.

The medium supplied to the pump fills a part of the interior of the pump which is defined by two pressing pieces or pressing parts 12 and 13, as well as the tooth gaps which are located at this instance in the region of these pressing pieces completely. This space is closed from below by a disk-shaped bottom of the outer wheel 5 whose teeth extend perpendicularly to the plane of the drawing of FIG. 3. The upper limiting is performed by a cover which is removed in FIG. 3. When the outer wheel 5 is driven in direction of the arrow 14, the pinion 6 is entrained for rotation in the same direction. The medium is transported via the tooth gaps 11 and 9 to the outlet 15 of the pump. In this region the teeth alternatively engage into the tooth gaps and thereby perform emptying of the tooth gaps into the outlet 15 and then into a pocket 16 of the housing, which is precoupled thereto.

A filling pipe 17 is connected with the outlet 15 of the filling pump 2. A serrated sausage sleeve 18 is located on the filling pipe 17. It extends through a gap space between the free end of the filling pipe and a so-called braking ring 19. The front end of the sleeve 18 as considered in a discharge direction 20 is closed in a suitable manner, for example by a knot. When the sausage stuffing or the like is pumped into the sausage sleeve which is closed forwardly, the sausage sleeve is filled. It is successively removed from the filling pipe and deserrated, i.e. the serrations are removed. The thus filled and continuously produced sausage strand 21 is then constricted in a manner which will be described hereinbelow, to form sausages of uniform length.

The filling pump 2 is driven intermittently by an electricl controllable motor 22, which in particular is formed as a magnetic rotor. The motor is controllable by a microprocessor of an electrical control device 23. A line 24 symbolizes an electrical connection of the control device 23 with the motor 22. In a slow production process, the continuously produced filled sausage strand 21 stands still, while the filling pipe 17 with the sausage sleeve 18 and the braking ring 19 turns at least once about their longitudinal axis. Since, however, these processes are performed with extraordinary speed, for example 300 to 400 times per minute, in reality braking and acceleration of the motor 22 and a rotary device 25 is performed by means of a second, electrically controlled motor 26 in a manner which will be described hereinbelow. The second motor is also driveable and controllable via the microprocessor for the electrical control device 23. This is shown symbolically by a line 27 in FIG. 2. The motor 26 can be formed as a servo motor or a magnetic rotor. Both motors 22 and 26 are turned on and turned off alternatingly. Their operation during fast processes or in other words when a high number of sausages are produced per time unit, can be easily controlled by a sine curve and a superimposed cosine curve (See FIG. 8).

The controllable motor 22 or its output shaft 28 is drivingly connected with a pump drive shaft 37 by means of at least one transmission 29, in an indirect manner in the shown example. The transmission 29 can be formed preferably as a toothed belt transmission with a driving wheel 30 arranged on the output shaft 28 and a driven wheel 31 as well as a toothed belt 32. The driven wheel 31 is supported on a transmission shaft 33 which carries a pinion 34 of a transmission 35. It engages with a toothed wheel 36 on the drive shaft 37 of the pump.

The transmission shaft 33 extends outwardly beyond the transmission housing and a transmission shaft extension 38 carries a driving wheel 39 of a further transmission 40, which can also be formed as a belt transmission or a tooth belt transmission. A belt 41 of the transmission 40 drives a pinion or a wheel 42 which is mounted on a driving shaft of a pulse generator 43. The pulse generator is also connected with the electrical control device 23 as schematically shown in FIG. 1 by a line 44. It supplies the required pulses which are used for controlling the drive of the machine and various functions, for example apportioning, to the processor of the microcomputer.

The transmission shaft extension 38 is drivingly connected, for example, by a releasable coupling 45, with a driving shaft 46 for a feeding element 47. This element is a part of a feeding device which forcibly feeds the medium in the filling container 1 to the pump inlet 4. The driving shaft 46 carries a pinion 48 on its upper end as shown in FIG. 1. The teeth of the pinion 48 engage with the teeth of a toothed rim 49. The toothed rim is connected with the feeding element 47 which extends through it in an axial direction, so as to be secure against rotation. The feeding element is designed as a conveyor screw and composed of a band-shaped material. The band-shaped material is curved to form a conical spiral which is shown in FIG. 1 and corresponds to the contour of the container.

Figure 2:
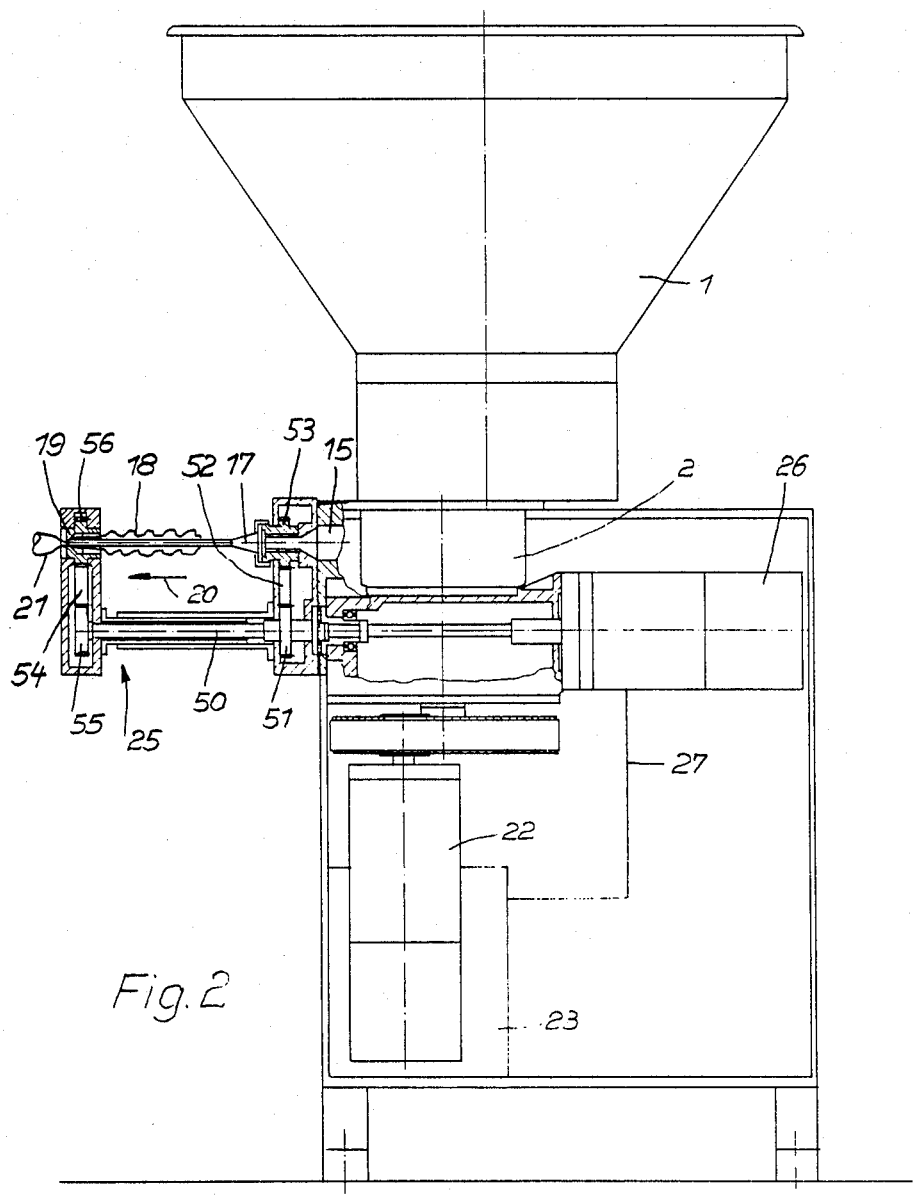
FIG. 2 is a side view of the machine also partially sectioned in a vertical direction.

The rotary device 25 is preferably removable. It includes a counter shaft 50 which is intermittently driven by the second motor 26 as shown in FIG. 2. A first pinion 51 of the countershaft 50 drives a toothed wheel 53, for example by means of a belt 52. The toothed wheel 53 is fixedly connected with the filling pipe 17 or formed of one piece with the latter. The belt 52 can be formed as a toothed belt, similarly to the belt 54, which provides the rotary connection between a second pinion 55 or the like and a second toothed wheel 56 or the like. The latter is formed on a holder for the braking ring or connected with the same. Both transmissions 51, 53 and 55, 56 are identical to ensure a synchronous rotation of the filling pipe 17 and the braking ring 19, including the serrated sausage sleeve 18.

Figure 4:
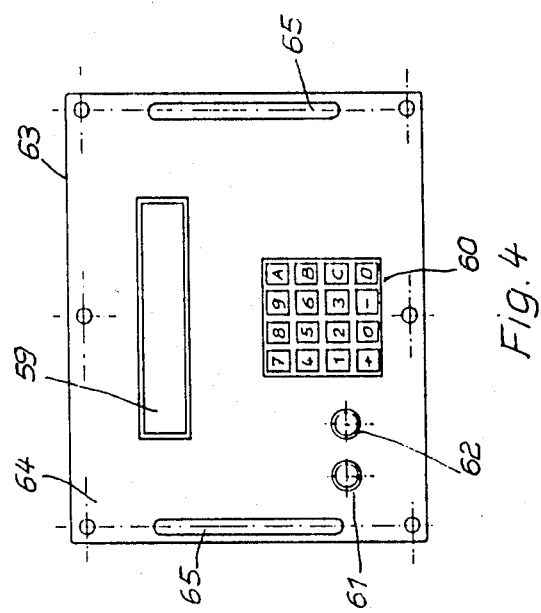
FIG. 4 is a view of a front plate of a control unit of the machine.
Figure 5:
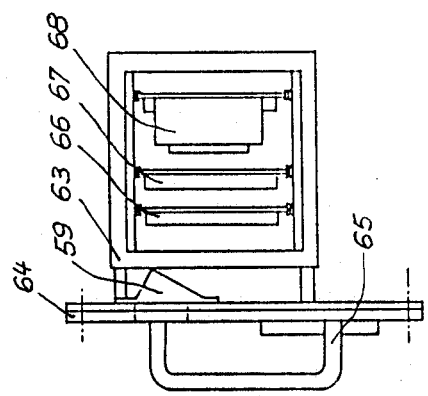

The electricl control device 23 imparts to the filling machine a very high flexibility with respect to the type of the filling article and an especially high filling speed. It can also be formed as a control unit 63 which contains an operator console 57 with an indicator 59, a keyboard 60 and connections 61 for a random sampling scale and 62 for a record printer. The control unit 63 is also available via an insertion plate, for receiving a processor card 66, an input/output card 67 and a power element 68 as shown in FIGS. 4 and 5.

Figure 6:
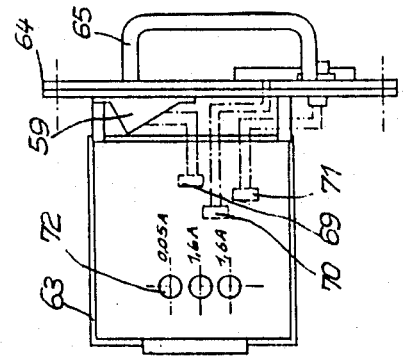
FIGS. 5 and 6 are side views of the control unit of the machine.

FIG. 6 shows an arrangement of plugs 69 for connecting the indicator 59, 70 for connecting the keyboard 60, and 71 for connecting a printer and a scale. Safety elements for protecting the electrical parts are identified with reference numeral 72.

A central processing unit (CPU) is an important part of the electrical control device 23. The electrical control device 23 produces electrical control signals for service, adjustment and operation. The standard functions which are controlled include portioning, turning, operation pauses, and a correction of the dosing for the first portion. Moreover, the filling speed can be adjusted with the operating voltage of the first and second servo motors 22 and 26. The operating voltage of the servo motors has a ramp-like course in the region from 0 to 10 volts maximum, wherein the value of 10 volts corresponds to the maximum filling speed (100%). The ramp-shaped operating voltage, which is called in an abbreviated form "control ramp", can be adjusted in its shape or its course to the consistency of the filling product and the property of the packing material. The desired values are determined empirically and then stored in a read-/write memory.

The electrical control device 23 is available, as mentioned hereinabove, via a read-/write memory 77 which can store such apportioning parameters as weight, pause, turning, turning delay, filling speed and so on, for 100 different portions. The read-/write memory 77 is supplied via an emergency power supply 83, such as an accumulator, which is located on the processor plate, so that when the device is turned off or the processor card is removed, the portion data remain stored. New portions can be introduced or changed by the keyboard 60 which is provided with sixteen keys. After turning on of the machine, an information line in the twenty location alpha-numerical indicator is displayed. It indicates the portion number, name and weight. The desired portion and its data can be called by introducing the portion number and data pertaining thereto.

By actuation of the operation key D which is one of four operation keys A through D, all portion parameters can be indicated after one another and can be introduced, changed or varied via the plus sign or minus sign key during running of the filling machine.

As mentioned hereinabove, the front plate 64 of the control unit 63 shown in FIG. 4 has two cutting point bushes 61 and 62 for V 24 or RS 232 cutting points, which make possible the connection of a random sample scale and a printer. Deviations of the rndom samples from the desired value are processed to a correcting value which is indicated and stored in the portioning parameter "correction".

The random samples are recorded by the printer. By actuation of the operation key C or during start of a new portion, an evaluation of the statistical data of the random samples is printed out (desired value, number, average value, standard deviation, minimum and maximum). During start of the random sampling and evaluation, the date and hour are printed out, being supplied from a clock 82 connected via a processor bus 75 to the CPU 73.

For securing the introduced portion data, they can be stored after connection of an external memory, for example a cassette recorder, on a storage medium which in the case of a cassette recorder is formed as a cassette.

Figure 7:
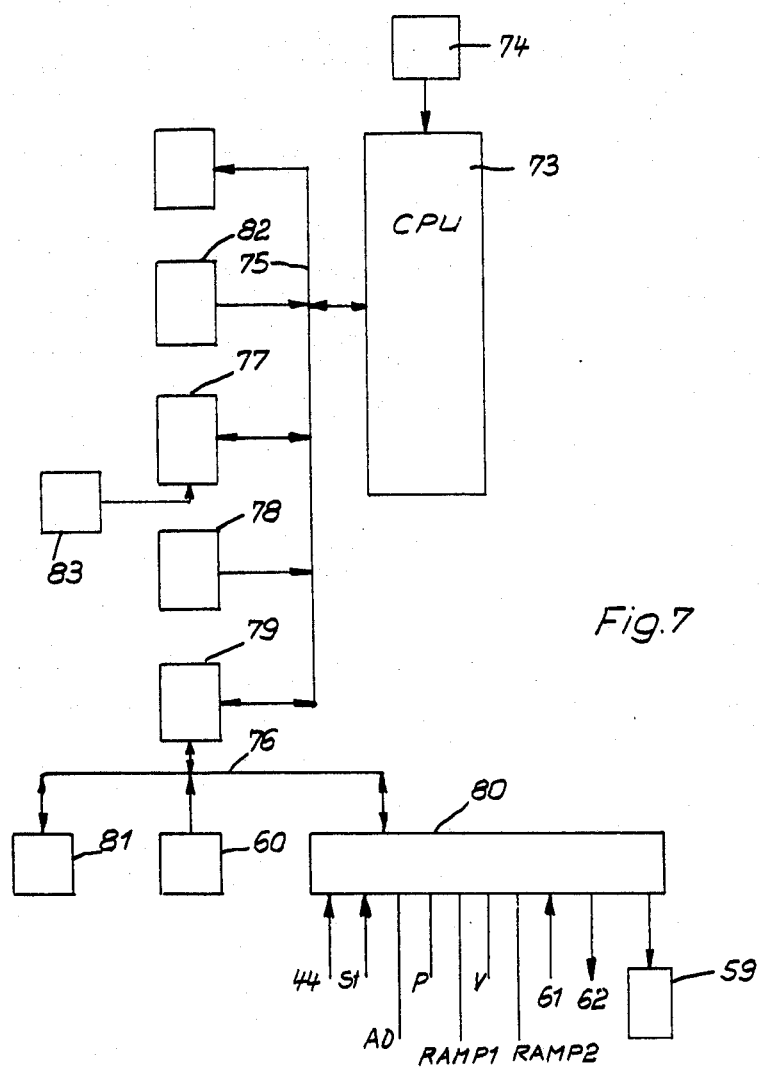
FIGS. 7 and 8 are two block diagrams of the electrical control.

The operating voltage of the servo motors with adjustable accelerating and braking ramp, as well as the programmable filling speed control the filling and turning process, which latter is indicated with the turning signal AD as shown in FIG. 7.

The introduction of the operational parameters is performed in two planes, namely in (a) filling plane and (b) system plane, as listed hereinbelow:

| (a) Filling plane: | |
|---|---|
| 0 portion = | input of the portion number |
| 1 correction = | input of correction value optimization by +/− key weighing correction by correction scale acts on correction value |
| 2 post running = | no input measurement of the machine run down |
| 3 1.portion = | change of the 1. portion −50 to +150 gram |
| 4 pause = | input limited to 5 second = max. value of turning delay = min. optimization by +/− key release milliseconds |
| 5 turning = | input 0–0.6 seconds optimization by +/− key release milliseconds |
| 6 turning delay = | input 0 to 0.150 seconds adjusted pause limited Turning delay Optimization by +/− key release milliseconds |
| 7 filling speed = | Input in % Optimization by +/− key |

| -continued | |
|---|---|
| | Release 0.4% |
| 8 weight input = | input 0–30,000 Grams |
| 9 portions per strand = | Input 1 to 9 for weighing correction Number of portions which are together weighed desired value = portions/ strand × portion weight |
| 10 name = | Name input for portion by +/− key Position of the sign 0–9 sign passage with programmable loop activated digit = loop multiplicator |
| 11 with/without clipper = | turning on or off of the self holding of the start signal till portion end Indicator yes/no Changing over by actuation of a digit key |
| 12 plane exchange = | selection of filling plane-system plane: Changing over by actuation of a digit key |
| (b) system plane: | |
| 13 clock adjustment = | indication and adjustment of the clock blocks |
| 14 storing on cassette = | portion storing on cassette stored via FSK-Modem |
| 15 charging of cassette = | from cassette to portion memory charged via FSK-Modem |
| 16 cutting points = | adjusting of the cutting points parameter Baud rate, transmission format. |

The introduced parameters are respectively processed by the electrical control device and supplied for production of the respective output ramp, including of an apportioning signal P, a turning signal AD, and a speed correction signal V which is always produced when the speed measured by the pulse generator 43 is too high. The pulse generator is dimensioned for a wide region of applications and operational conditions and in the shown example provides one gram per pulse.

For the control process, this means that for example for production of 250 g of sausage, 250 pulses per sausage are produced. When the filling machine operates with a speed of 100 sausages per minute, this pulse corresponds to 25,000 pulses per minute or $416\frac{2}{3}$ pulses per second, which corresponds to a pulse frequency of 416.666 Hz.

As can be seen from the above presented table in the lines (a) 5, 6 and 7, the turning or clipping is adjustable in predetermined limits. Thereby the desired operational parameter is achieved in a optimal manner. This is also true for the correction of the first portion which is required for the following reason.

When the machine starts running or in other words the first part of the packing sleeve is filled with the pasty medium, the pump must also be filled and only when it is filled completely and the pasty medium is pumped to the front end of the serrated packing sleeve, a continuous pump pressure is achieved in the form of a return thrust. During the formation or filling of the first portion, the pump operates first with increasing or in other words non-constant pressure. This means that with the certain pulse number for the weight of the portion, a first portion is produced with too low weight, which results for example in a too short first sausage. When in the presented example for the selected 250 g sausage, 250 pulses are provided, the sausage will weigh presumably only 220 g, since its front end is filled with too low a pressure. An empirical correction value can be supplied to the electrical control device 23 and stored there, so that the first portion of different portion numbers will later be produced every time with correct weight.

FIG. 7 shows important components of the electrical control device 23 which is composed of a central processing unit (CPU) 73 formed for example as a microprocessor of a known type whose operation is controlled in time by a timing generator 74. The central processing unit 73 is connected with a read-/write memory 77, a read memory 78 and a programmable input-/output adaptor via a processor bus 75 which has required control, address and data conduits. The adaptor is connected with an input-/output control 80, a timer 81 and the keyboard 60 via an input-/output bus 76. The indicator is connected with the microprocessor by the input-/output control 80. The clock provided for making records gives the time and date and is connected via the above mentioned processor bus 75.

In the microcomputer shown in FIG. 7 the input-/output control 80 performs a special function to supply external control signals such as for example the pulses of the pulse generator 43 via the conduits 44, the starting signal ST or for example the data of the random sample scale via the connection 61 to the microcomputer, or to supply control signals from the computer to remaining electrical components such as for example the output RAMP 1 for the first servo motor 22 and RAMP 2 for the second servo motor 26, or the data to be printed via the connection 62 to the printer.

Other signals, such as for example the turning signal AD or the portioning signal B or the speed signal V which signals a too high speed, are required for housekeeping signals of the processor, processor-inner processing. The exchange for the apportioning signal D and turning signal AD is shown in FIG. 8, which shows the counter-phase output RAMP 1 and RAMP 2.

The final form of the output ramps is substantially determined by the used material and the working speed or in other words by the product speed of the portions, and is obtained substantially empirically. These values are storeable, and the storage can be formed both at the read-/write memory 77 and the read memory 78 which contains the control program proper.

Figure 8:
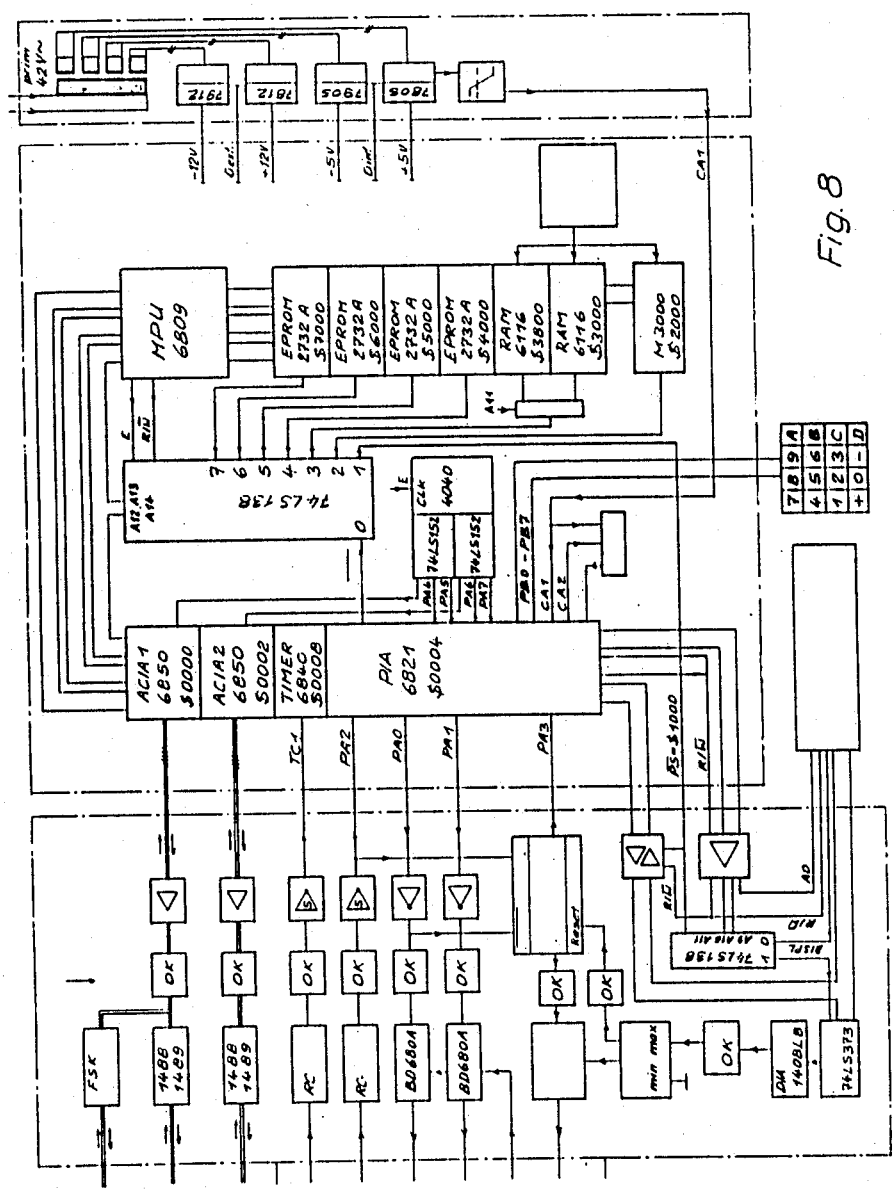
Figure 9:
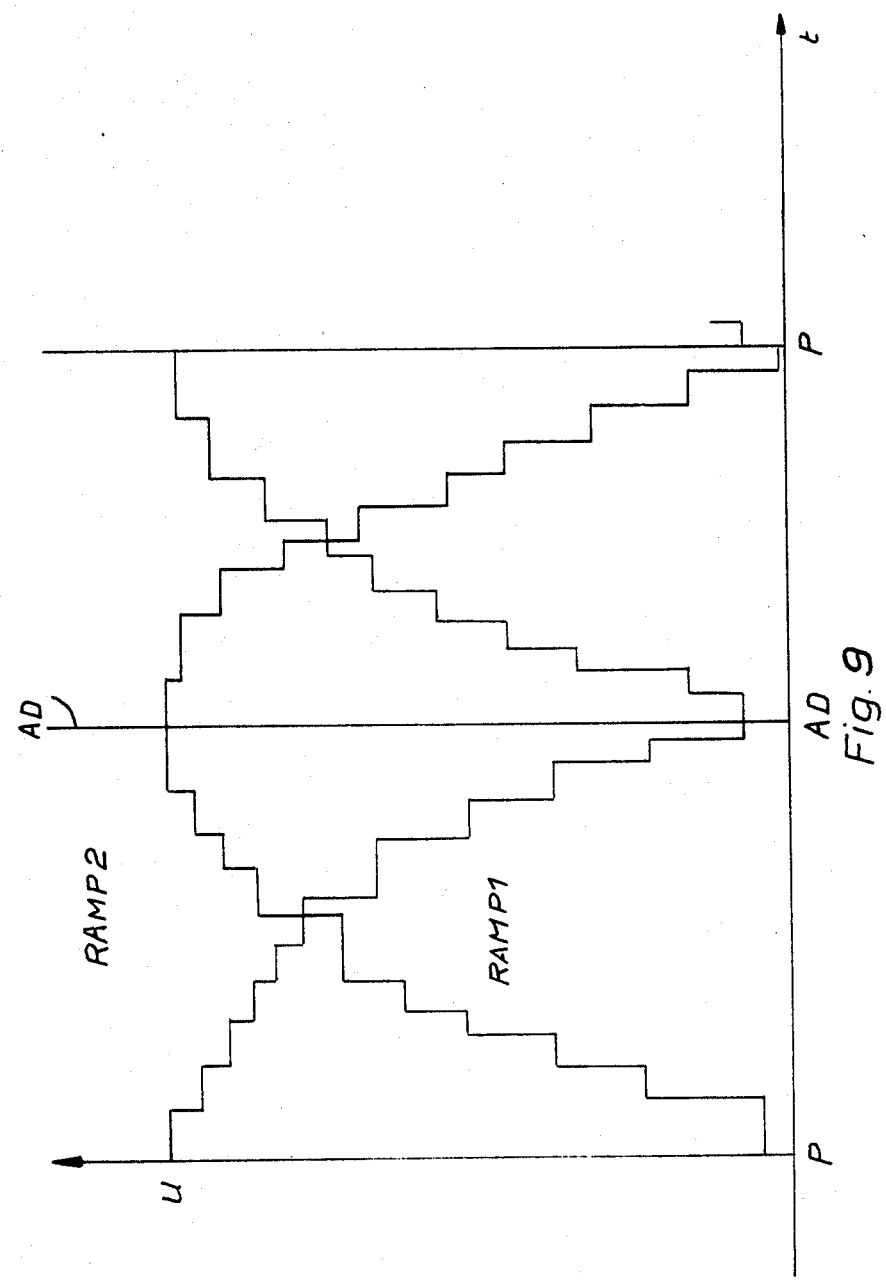
FIG. 9 is a view showing an operating voltage for servo motors.

The following description of the diagram relates to the block diagram of FIG. 8.

Processor plate
1. MPU-microprocessor 6809
2. Storage block
   (a) program memory EPROM 4×2732 A 16K byte
   (b) prescription memory-accu buffered RAM 2×6116 4K byte
3. I-O block
   (A)
      ACIA-asynchronous communication interface adaptor 6850
      ACIA 1-asynchronous cutting point for scale and FSK Modem
      ACIA 2-asynchronous cutting point for printer
   (B)
      PIA-peripheral interface adaptor 6821
      Input and output for machine control,
      keyboard interrogation,
      programmable baud rate adjustment
      too fast filling speed
      voltage monitoring
   (C)
      PTM-programmable timer 6840
      Input pulse-rotary pulse generator
      Portion counter
      Timing element for time bases 1 ms
4. Address coding
   8-bit-decoder 74LS138-8 address block
   0-IOSEL-I-O Block (ACIA, PIA, PTM)
   1-PS-plate selection indicator and D/A convertor
   2-HOUR-clock selection
   3-RAM-RAM selection
   4-EPROM 1
   5-EPROM 2
   6-EPROM 3-EPROM selection
   7-EPROM 4
5. Programmable baud rate generation
   12 bit-binary counter 4040
   2×8 BIT-multiplexer 74LS152
6. Voltage monitoring
   Charge voltage at +5 V supply
7. Clock block accu buffered
   Output of data and time for statistical documentation I-O-Plate
1. V 24 (RS 232 C)-4 wire cutting points
   galvanic decoupling by opto coupler
   with RS 232 C-driver 1488 L
   and RS 232 C-receiver 1489 L
   for scale and printer connection
2. FSK-Modem for cassette recorder connection for securing prescription memory content on cassette
3. Machine connection
   (A) transistor output for portion and turning for controlling of magnet valve galvanic decoupling by opto coupler
   (B) inputs for start and pulse with RC elements for suppressing and galvanic decoupling by opto coupler
   (C) Analog output
      (a) control for turning current servo drive with control ramp 0–10 V with an analog galvanic decoupling
      (b) control of the stroke adjusting device (programmable speed adjustment) for pneumatic/hydraulic drive 0–5 V with analog galvanic decoupuling
4. Indicator control via data bus and address bus drivers
5. Digital/analogue converter with data bus memory for programmable speed adjustment.

Three examples are provided herein below, namely Example 1 is an example of an adjusted portion, Example 2 is an example of a parameter change during operative apportioning, and Example 3 is an example of a parameter change with turned-off apportioning. EXAMPLE 1

With an adjusted apportioning machine on: last filled portion is indicated

| Key | Reading | Parameter number + notes |
|---|---|---|
| With turned-off apportioning | 01 Salami | 500 g  0 = Portion |
| D | 01 Correction | 0 g  1 = Correction |
| D | 01 1. Portion | +60 g  3 = Correction 1. Portion |
| D | 01. Pause | 0.500 s  4 = Pause |
| D | 01. Turning | 0.120 s  5 = Turning |
| D | 01. Turning delay | 0.050 s  6 = Turning delay |
| D | 01. Filling speed | 50.0%  7 = Filling speed |

-continued

| Key | Reading | Parameter number + notes | |
|---|---|---|---|
| D | 01. Weight | 500 g | 8 = Weight input |
| D | 01. Portion/strand | 1 | 9 = Portion per strand |
| D | 01. Name → Salami | | 10 = Name |
| D | 01. With clipper → | No | 11 = With/without clipper |
| D or A | 01. Filling plane | | 12 = Plane change |
| D or A | 01. Salami | 500 g | 0 = Portion |
| B | 01 Pause | 0.500 s | 4 = Pause |
| C | Reading unchanged | | Statistical output to printing |
| | Portioning Started | | |
| With operating apportioning | | | |
| A | 01 Salami | 500 g | 0 = Portion |
| D | 01 Correction | 0 g | 1 = Correction |
| D | 01 Post running | 92 g | 2 = Post running measurement |
| D | 01 1. Portion | +60 g | 3 = Correction 1. Portion |
| 3 × D | 01 Filling speed | 50.0% | 7 = Filling speed |
| D | 01 Salami | 500 g | 0 = Portion |

EXAMPLE 2

Parameter change during operating apportioning

| Key | Reading | Parameter Number + Notes | |
|---|---|---|---|
| During operating apportioning | | | |
| D | 01 Salami | 500 g | No change |
| D | 01 Correction | 0 g | |
| +8 times or approximately 2 seconds | 01 Correction | +8 g | Correction value +8 g |
| −12 times or approximately 3 seconds | 01 Correction | −4 g | Correction value 12 g reduced |
| D | 01 Post running | 92 g | No change |
| D | 01 1. Portion | +60 g | Change as correction |
| D or B | 01 Pause | 0.500 s | |
| +approximately 3 seconds | 01 Pause | 0.581 s | Value runs high approximately 25 ms/Sec |
| −approximately 1 second | 01 Pause | 0.565 s | Value runs down |
| −short | 01 Pause | 0.564 s | Value lower by 1 ms |
| +2 × short | 01 Pause | 0.566 s | Value higher by 2 ms |
| D | 01 Turning | 0.120 s | Changes as during |
| D | 01 Turning delay | 0.050 s | Pause |
| D | 01 Filling speed | 50.0% | |
| +1 times | 01 Filling speed | 50.4% | Value increased by 0.4% |
| −2 times | 01 Filling speed | 49.6% | Value lower by 0.8% |
| −approximately 3 seconds | 01 Filling speed | 42.0% | Changes approximately 2.5%/Sec. |
| D | 01 Salami | 500 g | |

EXAMPLE 3

Parameter change with turned off apportioning

| Key | Reading | Parameter Number + Notes | |
|---|---|---|---|
| apportioning from | 01 Salami | 500 g | |
| 5 | 15 Portion | 0 g | Portion 15 not coated |
| 0 | 50 Portion | 0 g | Portion 50 not coated |
| 2 | 02 Viennese | 100 g | 02-Portion number Viennese called up |
| D | 02 Correction | 0 g | |
| 2 | 02 Correction | 2 g | 2 Input |
| 3 | 02 Correction | 23 g | 23 Input |
| + or D 1 times | 02 Correction | +23 g | Correction positive |
| 4 | 02 Correction | 4 g | 4 Input |
| 1 | 02 Correction | 41 g | 41 Input |
| −1 times | 02 Correction | −41 g | Correction negative |
| D | 02 1. Portion | +50 g | Input as correction |
| D | 02 Pause | 0.600 s | |
| 1 | 02 Pause | 1. s | 1 Input |
| 2 | 02 Pause | 1.2 s | 1.2 Input |
| 0 or A, B, C, D, +, −. | 02 Pause | 1.20 s | 1.20 Input |
| 0 or A, B, C, D, +, −. | 02 Pause | 1.200 s | Input ready |
| D | 02 Turning | 0.300 s | Input as |
| D | 02 Turning delay | 0.300 s | Pause |
| D | 02 Filling speed | 100.0% | |
| 2 | 02 Filling speed | 2% | 2 Inputted |
| 9 | 02 Filling speed | 29% | 29 Inputted |
| D | 02 Filling speed | 29.% | Decimal point Inputted |
| 7 | 02 Filling speed | 29.6% | Rounded to release Input ready |
| D | 02 Weight | 200 g | |
| 4 | 02 Weight | 4 g | 4 Inputted |
| 6 | 02 Weight | 46 g | 46 Inputted |
| 0 | 02 Weight | 460 g | 460 Inputted |
| 1 times A, B, C, D or + | 02 Weight | 460 g | Input ends |
| D | 02 Portion/Strd. = 1 | | 1 Portion per |

-continued

| Key | Reading | Parameter Number + Notes | |
|---|---|---|---|
| 3 | 02 Portion/Strd. = 3 | | strand adjusted 3 Portions per strand adjusted Desired value = 3 × 460 g = 1380 g Weight on scale is compared with 1380 |
| A | 02 Viennese | 3 × 460 g | Reading in head line Desired weight = 3 × 460 g |
| D 9 times | 02 Name → | Viennese | ←Name with underlined sign position |
| −7 times | 02 Name → | Viennese | ←Position indicator 7 locates to right |
| 0 to 9 till desired digit appears | 02 Name → | Viennese | ←Sign runs until key is released 0 to 9 different running speeds |
| +1 times | 02 Name → | Viennese | ←Position indicator 1 location to the left |
| 0 to 9 until desired digit appears | 02 Name → | Vienna | ←Sign runs until key is released |
| D | 02 With clipper → | No | |
| 0 to 9, +, − | 02 With clipper → | Yes | Fast turning off turned on |
| 0 to 9, +, − | 02 With Clipper → | No | Fast turning off turned off. During releasing of starting lever the portion is completed |
| A | 02 Vienna | 3 × 460 | Back to command line |

It will be understood that each of the elements described above, or two or more together, may also find a useful application in other types of constructions differing from the types described above.

While the invention has been illustrated and described as embodied in a machine for filling pasty media, it is not intended to be limited to the details shown, since various modifications and structural changes may be made without departing in any way from the spirit of the present invention.

The foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A machine for filling pasty media, particularly sausage stuffing, into a hose shaped sleeve, comprising a filling pump having a pressure side;
   a filling pipe for receiving a sausage sleeve and connected with said pressure side of said filling pump and having a free end;
   a braking ring arranged so that a medium is pulled through the sleeve between said braking ring and said free end of said filling pipe;
   an electrically controlled motor which intermittently drives at least said pump;
   a microcomputer which controls said motor;
   a removable turning device for forming sausage tips;
   means for driving said turning device; and
   a second controllable motor arranged for driving said turning device, said second motor being controllable by said microprocessor.

2. A machine as defined in claim 1, wherein said pump is formed as a gear pump and has a drivable outer wheel provided with a plurality of inner teeth, and a pinion which is supported eccentrically to said outer wheel and provided with a plurality of outer teeth which engage with said inner teeth of said outer wheel.

3. A machine as defined in claim 1, wherein said medium and sleeve together form a sausage strand; and further comprising a controllable clip setting device arranged for subdividing the sausage strand into a plurality of individual sausages at uniform distances, when said pump is turned off.

4. A machine as defined in claim 1, wherein said medium and sleeve together form a sausage strand; and further comprising a controllable clip setting device arranged for subdividing the sausage strand into a plurality of individual sausages at adjustable distances when said pump is turned off.

5. A machine as defined in claim 1: and further comprising a turning device for turning said filling pipe by at least one revolution when said pump is turned off for forming sausage tips.

6. A machine as defined in claim 1, wherein said outer wheel of said pump has a drive shaft; and further comprising a transmission which connects said motor with said drive shaft of said outer wheel.

7. A machine as defined in claim 6, wherein said transmission which connects said motor with said drive shaft is formed as a toothed belt transmission.

8. A machine as defined in claim 6, wherein said transmission has a transmission shaft; and further comprising a pulse generator which is driven by one of said shafts for controlling said pump.

9. A machine as defined in claim 8; and further comprising a further transmission which connects said pulse generator with said at least one of said shafts in a driving connection.

10. A machine as defined in claim 9, wherein said further transmission which connects said pulse generator with said at least one of said shafts is formed as a belt transmission.

11. A machine as defined in claim 9, wherein said further transmission which connects said pulse generator with said at least one of said shafts is formed as a toothed belt transmission.

12. A machine as defined in claim 8, wherein said pump has a pump inlet; and further comprising a filling container which communicates with said pump inlet and accommodates a feeding element provided with a drive, said at least one of said shafts being formed as a driving element of said drive of said feeding element.

13. A machine as defined in claim 12, and further comprising means for driving said feeding element and including a toothed element and a pinion which engages with said toothed element and driven by said at least one of said shafts.

14. A machine as defined in claim 13, wherein said toothed element of said means for driving said feeding element is formed as a toothed wheel.

15. A machine as defined in claim 13, wherein said toothed element of said means for driving said feeding element is formed as a toothed rim.

16. A machine as defined in claim 12, wherein said feeding element is formed as a feeding screw composed of a band-shaped conical spiral, said filling container having a conical shape at least in the region of said feeding element.

17. A machine as defined in claim 13, wherein said toothed element of said means for driving said feeding element is formed so that said feeding element extends through said toothed element and projects outwardly beyond said toothed element at each side thereof.

18. A machine as defined in claim 1; and further comprising a countershaft which is driven by said second motor and has a first pinion and a second pinion, said first pinion being in a driving connection with said filling pipe, while said second pinion is in driving connection with said braking ring so as to be driven synchronously.

19. A machine as defined in claim 18, wherein said filling pipe has a toothed wheel which is in a driving connection with said first pinion of said countershaft, said braking ring having a second toothed wheel which is in driving connection with said second pinion of said countershaft.

20. A machine as defined in claim 1; and further comprising a microcomputer which includes said microprocessor, memory means connected to said microporcessor and input/output means for controlling said motor.

21. A machine as defined in claim 1, wherein said motor is a first motor; and further comprising an additional device for subdividing the sausage strand into a plurality of sausages and provided with a second motor; a pulse generator for controlling said pump; and a microcomputer which includes said microprocessor, memory means and input/output means, said pulse generator forming pulses which indicate a predetermined filling weight quantity per pulse and a nominal weight quantity of a portion to be filled, said microcomputer generating from said pulses of said pulse generator and from physical data of a filling product and from a filling material and also from a predetermined filling speed, a first operative voltage ramp for said first motor, which drives said filling pump and also a counter-phased second operating voltage ramp for said second motor, which controls said device for subdividing the sausage strand.

22. A machine as defined in claim 21, wherein said device for subdividing the sausage strand is formed as a turning device provided with said second motor.

23. A machine as defined in claim 21, wherein said device for subdividing the sausage strand is formed as a clip setting device provided with said second motor.

24. A machine as defined in claim 21, wherein said microcomputer is formed so that for apportioning of a first portion of a medium charge a correction value corresponding to a start-up operation is produced, and the correction value corrects a pulse number supplied from said pulse generator for the first portion so that a desired weight quantity of said first portion is maintained.

25. A machine as defined in claim 24, further including production control means, and wherein said memory means are formed so that the correction value of each medium charge is stored and may be called up for production of the first portion of the charge, and wherein said correction value may be supplied to said production control means.

26. A machine as defined in claim 24; and further comprising a random sample scale which is connected with one of said input/output components for automatic production of the correction value and for automatic production monitoring of the media to be filled into said machine.

27. A machine for filling pasty media, particularly sausage stuffing, into a hose-shaped sleeve, comprising
a filling pump having a pressure side,
a filling pipe for receiving a sausage sleeve and connected with said pressure side of said filling pump and having a free end;
a braking ring arranged so that a medium pulled through the sleeve between said braking ring and said free end of said filling pipe;
a pulse generator actuated by a pump drive for generating pulses indicating a set filling amount per pulse;
an electrically controlled motor formed as a magnetic rotor which motor is controlled by the pulses indicating filling amount and which motor drives intermittently based on control with said filling amount pulses at least said pump; and
a microcomputer which controls said motor.

28. Computer-controlled machine for the filling of a doughy substance, in particular of sausage stuffing, into a tube-like casing (18) by means of a filling pump (2) driven by an electrically controllable first motor (22), where the pressure side of said filling pump (2) is connected in the direction of flow with a filling tube for receiving a gathered-up sausage casing (18), where the casing is being pulled off by the emitted substance between a braking ring (19) and a free end of the filling pipe and moreover with a pulse generator (43) actuated by a pump drive, which pulse generator generates pulses, which indicate a set filling amount per pulse, furthermore comprising
a controllable second motor (26), which drives the filling tube (17) and a rotary device (25) in an approximately synchronous manner, where the two motors (22, 26) are driven intermittently and in antiphase by a microcomputer, which microcomputer comprises a microprocessor (73), memory banks (77, 78), and input/output components (79, 80).

29. Computer-controlled machine according to claim 28, wherein for the dosing of the respectively first portion of a charge, a corrected value, reflecting the starting operation, is generated, which corrects the pulse number delivered for the first portion of the pulse generator (43) in such a way that the desired weight amount of the portion is maintained.

30. Computer-controlled machine according to claim 29, wherein the correction value for each charge is storable and recallable from the memory (77, 78) for the production of the respectively first portion of a charge and can be fed to the control.

31. Computer-controlled machine according to claim 28, comprising a random sample scale for automatic generation of the correction value, connectable via an input/output control (80), and moreover for the continuous automatic production surveillance of the filling amounts.

32. Computer-controlled machine according to claim 28, wherein said microcomputer generates a first operating voltage ramp (RAMP 1) for the first motor (22) and a second operating voltage ramp (RAMP 2) for the second motor (26) by means of the pulses of the pulse generator, which pulses indicate a set filling amount per pulse and the set weight amount of the filling product and of the filling material and also of the preset filling rate.

* * * * *